US012640969B2

(12) United States Patent 
Makari

(10) Patent No.: US 12,640,969 B2 
(45) Date of Patent: May 26, 2026

(54) SERIAL DATA RECEIVING APPARATUS AND SERIAL DATA RECEIVING METHOD

(71) Applicants: Kabushiki Kaisha Toshiba, Tokyo (JP); Toshiba Electronic Devices & Storage Corporation, Tokyo (JP)

(72) Inventor: Hiroo Makari, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 328 days.

(21) Appl. No.: 18/239,878

(22) Filed: Aug. 30, 2023

(65) Prior Publication Data

US 2024/0322911 A1 Sep. 26, 2024

(30) Foreign Application Priority Data

Mar. 24, 2023 (JP) ................................. 2023-048775

(51) Int. Cl. 
H04L 25/49 (2006.01) 
H04L 7/04 (2006.01)

(52) U.S. Cl. 
CPC .......... H04L 25/4908 (2013.01); H04L 7/042 (2013.01)

(58) Field of Classification Search 
CPC . H04L 25/4908; H04L 1/0045; H04L 1/0047;
H04L 1/0061; H04L 1/0078; H04L
1/0091; H04L 1/12; H04L 1/16; H04L
1/1829; H04L 1/1835; H04L 1/0006;
H04L 7/04; H04L 7/041; H04L 7/042;
H04L 7/0079
See application file for complete search history.

(56) References Cited

U.S. PATENT DOCUMENTS 8,401,138 B2* 3/2013 Hayasaka ............... H04L 7/042
713/503
2012/0243877 A1 9/2012 Takahashi

FOREIGN PATENT DOCUMENTS

| JP | 2005-347930 A | 12/2005 |
| JP | 4967341 B2 | 7/2012 |
| JP | 2012-199817 A | 10/2012 |

* cited by examiner

*Primary Examiner* — Betsy Deppe 
(74) *Attorney, Agent, or Firm* — Kim & Stewart LLP

(57) ABSTRACT

A serial data receiving apparatus according to an embodiment includes a detection unit and an alignment unit. The detection unit is configured to detect a specific bit arrangement in which an idle code or an end code worth of one word, and a head code worth of one word are sequentially consecutive from a bit arrangement of parallel data worth of three words converted from serial data, an alignment of which is not adjusted. The alignment unit is configured to adjust an alignment of word data based on a bit boundary of the specific bit arrangement detected.

5 Claims, 6 Drawing Sheets

FIG. 4

| Code-Group Name | Octet Value | Octet Bits | Current RD− | Current RD+ |
|---|---|---|---|---|
| | | HGF EDCBA | abcdei fghj | |
| D0.0 | 00 | 000 00000 | 100111 0100 | 011000 1011 |
| D1.0 | 01 | 000 00001 | 011101 0100 | 100010 1011 |
| D2.0 | 02 | 000 00010 | 101101 0100 | 010010 1011 |
| D3.0 | 03 | 000 00011 | 110001 1011 | 110001 0100 |
| D4.0 | 04 | 000 00100 | 110101 0100 | 001010 1011 |
| D5.0 | 05 | 000 00101 | 101001 1011 | 101001 0100 |
| D6.0 | 06 | 000 00110 | 011001 1011 | 011001 0100 |
| D7.0 | 07 | 000 00111 | 111000 1011 | 000111 0100 |

FIG. 5

| SYMBOL | K CODE | MEANING | HEX VALUE | PATTERN TO BE SENT (+) | | PATTERN TO BE SENT (−) | |
|---|---|---|---|---|---|---|---|
| | | | | abcdei | fghj | abcdei | fghj |
| COM | K28.5 | Comma | 1BC | 110000 | 0101 | 001111 | 1010 |
| STP | K27.7 | Start TLP | 1FB | 001001 | 0111 | 110110 | 1010 |
| SDP | K28.2 | Start DLLP | 15C | 110000 | 1010 | 001111 | 0101 |
| END | K29.7 | END | 1FD | 010001 | 0111 | 101110 | 1000 |
| EDB | K30.7 | EnD Bad packet | 1FE | 100001 | 0111 | 011110 | 1000 |
| PAD | K23.7 | PAD | 1F7 | 000101 | 0111 | 111010 | 1000 |
| SKP | K28.0 | Skip | 11C | 110000 | 1011 | 001111 | 0100 |
| FTS | K28.1 | Fast Training Sequence | 13C | 110000 | 0110 | 001111 | 1001 |
| IDL | K28.3 | Idle | 17C | 110000 | 1100 | 001111 | 0011 |

FIG. 6

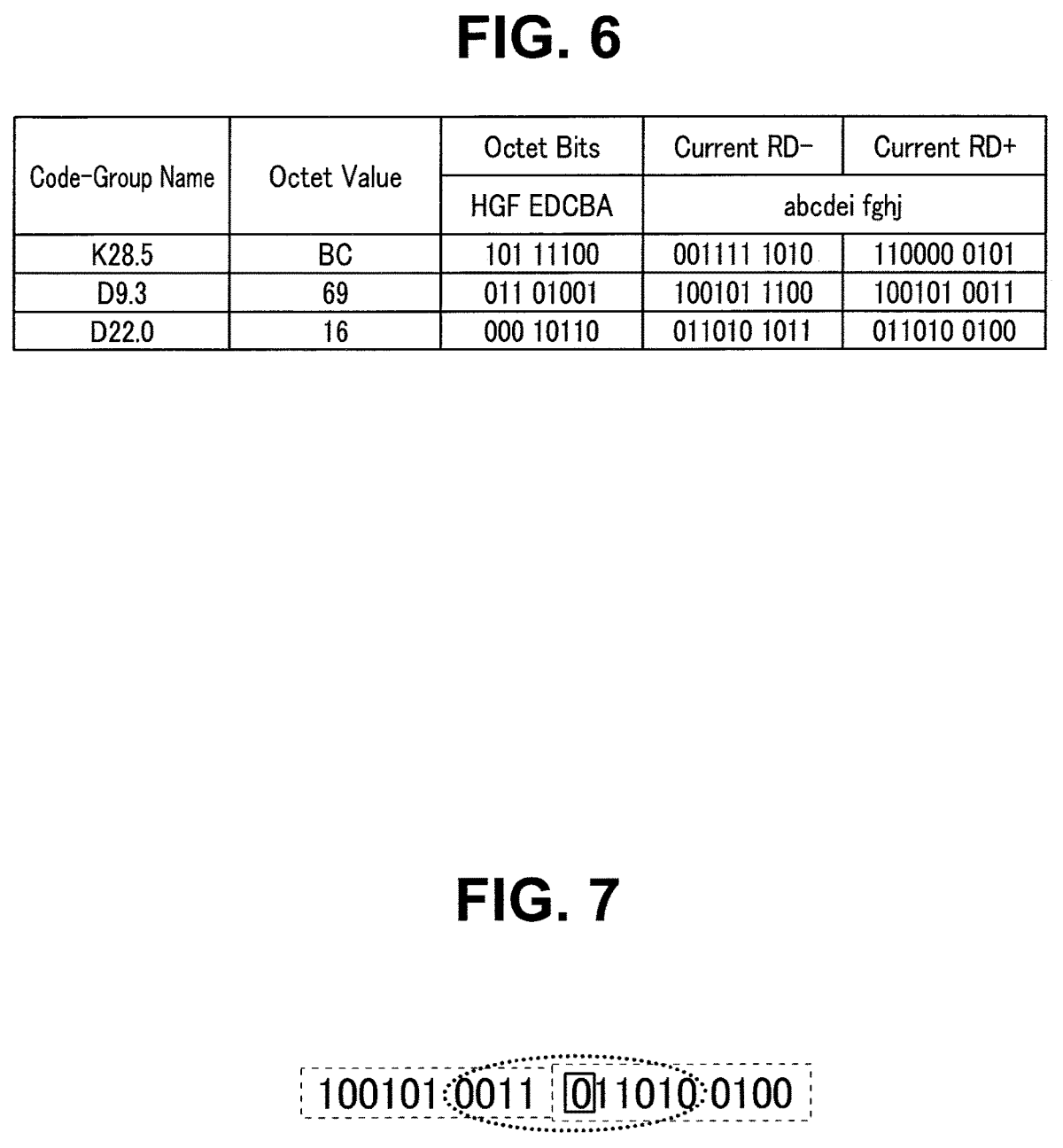

| Code-Group Name | Octet Value | Octet Bits | Current RD− | Current RD+ |
|---|---|---|---|---|
| | | HGF EDCBA | abcdei fghj | |
| K28.5 | BC | 101 11100 | 001111 1010 | 110000 0101 |
| D9.3 | 69 | 011 01001 | 100101 1100 | 100101 0011 |
| D22.0 | 16 | 000 10110 | 011010 1011 | 011010 0100 |

FRAME REJECTED          FRAME ACCEPTED

OCCURRENCE
OF ERROR

DID NOT PASS
CRC CHECK

FRAME REJECTED    M PIECES OF DATA    FRAME REJECTED

M PIECES OF DATA

OCCURRENCE
OF ERROR

FRAME
SYNCHRONIZATION
UNSUCCESSFUL

DID NOT PASS
CRC CHECK

SERIAL DATA RECEIVING APPARATUS AND SERIAL DATA RECEIVING METHOD

CROSS-REFERENCE TO RELATED APPLICATION

This application is based upon and claims the benefit of priority from the prior Japanese Patent Application No. 2023-048775 filed in Japan on Mar. 24, 2023; the entire contents of which are incorporated herein by reference.

FIELD

An embodiment described herein relates generally to a serial data receiving apparatus and a serial data receiving method for receiving serial data that is transmitted in units of packets.

BACKGROUND

Conventionally, serial communication schemes in which data is consecutively transmitted and received one bit at a time have been widely used. In high-speed serial communication, an 8B/10B encoding scheme which maps 8-bit data to 10-bit codes (also referred to as symbols) and transmits the 10-bit codes is in widespread use.

In the 8B/10B encoding scheme, a run length is limited so that, when mapping 8-bit data to 10-bit codes, a difference between the numbers of "1" and "0" in the data is always within ±1 and there are not more than 5-bit values of "0" or "1" in a row. Accordingly, a low-frequency component included in a serial signal can be suppressed and intersymbol interference (ISI) jitter can be reduced. Furthermore, in the 8B/10B encoding scheme, a maximum toggle frequency in which "0" and "1" are alternately repeated a plurality of times is prevented from being consecutive while straddling codes. Accordingly, a high-frequency component included in a serial signal is also suppressed.

When a packet constituted of a plurality of pieces of word data is transmitted from a serial data transmitting apparatus and received by a serial data receiving apparatus, a bit error may occur due to an effect of noise or the like. The serial data receiving apparatus detects an occurrence of a bit error by, for example, adopting an error detecting system such as CRC (cyclic redundancy check). When the serial data receiving apparatus detects a bit error, the serial data receiving apparatus transmits a retransmission request of the packet to the serial data transmitting apparatus.

However, depending on the bit error that occurred, an effect of the bit error may extend to packets other than the packet in which the bit error occurred.

BRIEF DESCRIPTION OF THE DRAWINGS

FIG. 4 is a chart showing an example of a part of a data code table used in the 8B/10B encoding scheme according to the first embodiment and the comparative example;

FIG. 5 is a chart showing an example of a control code table used in the 8B/10B encoding scheme according to the first embodiment and the comparative example;

FIG. 6 is a chart showing, side by side, a head code that indicates a head of a packet and two data codes as an example in the 8B/10B encoding scheme according to the first embodiment and the comparative example;

FIG. 7 is a diagram showing an example in which, in an event where a bit error occurs when the two data codes shown in FIG. 6 are consecutively transmitted, a same bit arrangement as a head code is created according to the first embodiment and the comparative example;

DETAILED DESCRIPTION

A serial data receiving apparatus according to an embodiment includes: a detection unit configured to detect a specific bit arrangement in which an idle code worth of one word that indicates that there is no data code or an end code worth of one word that indicates an end of a packet, and a head code worth of one word indicating a head of a packet are sequentially consecutive from a bit arrangement of parallel data worth of three words converted from serial data, an alignment of which is not adjusted; and an alignment unit configured to adjust an alignment of word data based on a bit boundary of the specific bit arrangement detected.

Figure 1:
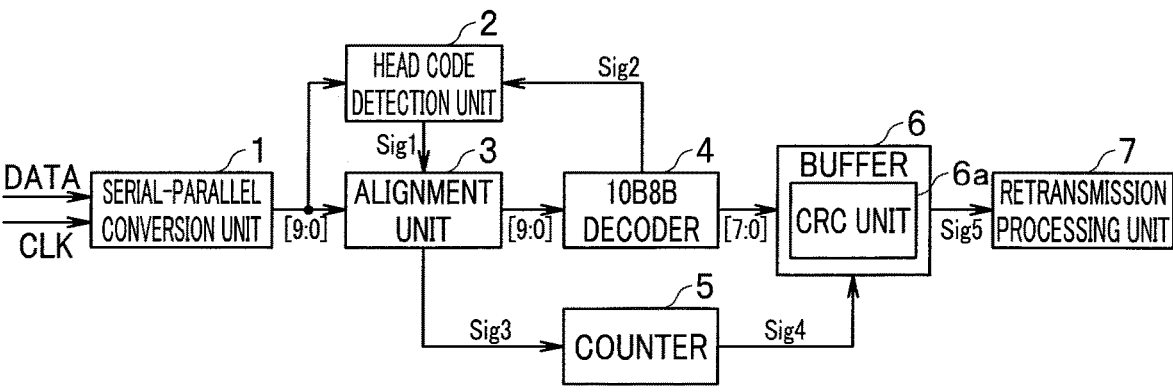
FIG. 1 is a block diagram showing a configuration of a serial data receiving apparatus according to a comparative example.

Hereinafter, a comparative example and the embodiment will be described with reference to the drawings. FIG. 1 is a block diagram showing a configuration of a serial data receiving apparatus according to the comparative example. The serial data receiving apparatus is a receiver configured to receive, in a serial communication system, serial data transmitted via a communication path from a serial data transmitting apparatus (transmitter). Hereinafter, an example of a serial communication system adopting an 8B/10B encoding scheme will be described.

The serial data receiving apparatus according to the comparative example includes a serial-parallel conversion unit 1, a head code detection unit 2, an alignment unit 3, a 10B/8B decoder 4, a counter 5, a buffer 6, and a retransmission processing unit 7.

The serial-parallel conversion unit 1 is configured to receive serial data DATA, convert the serial data DATA into parallel data with a first bit width (10 bits in the 8B/10B encoding scheme), and transmit the converted data as data worth of one word.

Specifically, the serial-parallel conversion unit 1 is configured to receive the serial data DATA and a clock CLK. The serial-parallel conversion unit 1 is configured to convert serial data DATA worth of 10 bits consecutively received in synchronization with the clock CLK into parallel data [9:0] and to transmit the parallel data [9:0].

Note that [9:0] indicates 10-bit data from a 0-th bit to a 9th bit. In addition, 10-bit or 8-bit data transmitted as parallel data in the serial data receiving apparatus will be referred to as word data when appropriate.

The serial-parallel conversion unit 1 is configured to simply convert the inputted serial data DATA into parallel data [9:0] for every 10 bits. Therefore, the parallel data [9:0] generally straddles two pieces of word data transmitted by the serial data transmitting apparatus and requires processing by the alignment unit 3 in a subsequent stage.

The head code detection unit 2 (second detection unit) is configured to hold 10-bit word data worth of two consecutive words received from the serial-parallel conversion unit 1. The head code detection unit 2 is configured to search for a bit arrangement of 10 bits that matches a head code K28.5 worth of one word (one of control codes (K codes)) (refer to FIG. 5) indicating a head of a packet pkt from among a bit arrangement of the held data worth of two words.

As a result of the search, when a bit arrangement matching the head code K28.5 is detected, the head code detection unit 2 is configured to transmit a boundary indication signal Sig1 indicating a bit boundary (word boundary) of an alignment. The boundary indication signal Sig1 includes information indicating by how many bits a 10-bit boundary of the word data received from the serial-parallel conversion unit 1 needs to be offset in order to obtain correct word data.

The alignment unit 3 is configured to hold 10-bit word data worth of two consecutive words received from the serial-parallel conversion unit 1. The alignment unit 3 is configured to transmit the parallel data received from the serial-parallel conversion unit 1 as-is until receiving the boundary indication signal Sig1 from the head code detection unit 2. When receiving the boundary indication signal Sig1 from the head code detection unit 2, the alignment unit 3 is configured to adjust an alignment by setting a correct 10-bit boundary in the bit arrangement of the held data worth of two consecutive words and to transmit one piece of word data an alignment of which has been adjusted to the 10B/8B decoder 4.

In addition, after receiving the boundary indication signal Sig1, the alignment unit 3 is configured to transmit a timing signal Sig3 to the counter 5 every time one piece of word data an alignment of which has been adjusted is transmitted.

The 10B/8B decoder 4 (a decoder in the 8B/10B encoding scheme) is configured to decode one piece of word data with the first bit width (10 bits in the 8B/10B encoding scheme) received from the alignment unit 3 into one piece of word data with a second bit width (8 bits in the 8B/10B encoding scheme) that is narrower than the first bit width by referring to a data code (D code) table such as a table shown in FIG. 4 and to a control code table such as a table shown in FIG. 5. The data code table and the control code table will be collectively simply referred to as code tables.

Figure 2:
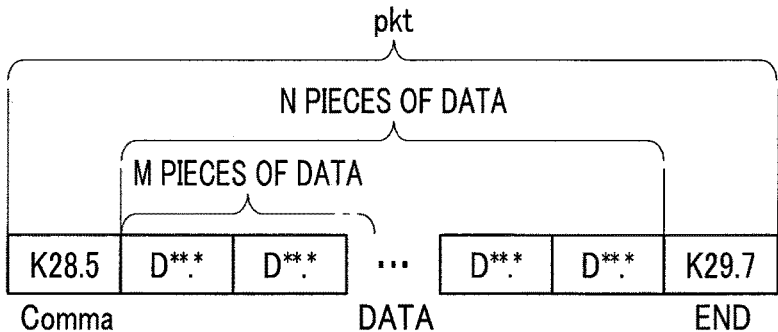
FIG. 2 is a diagram showing a general configuration example of a packet in an 8B/10B encoding scheme according to a first embodiment and the comparative example.

FIG. 2 is a diagram showing a general configuration example of the packet pkt in the 8B/10B encoding scheme according to the first embodiment and the comparative example. FIG. 5 is a chart showing an example of the control code table used in the 8B/10B encoding scheme according to the first embodiment and the comparative example.

As shown in FIG. 2 and FIG. 5, in the 8B/10B encoding scheme, the head code K28.5 that is a control code worth of one word indicating a head of the packet pkt is called "Comma". In addition, an end code K29.7 that is a control code worth of one word indicating an end of the packet pkt is called "END".

One packet pkt starts with the head code K28.5 (Comma) and ends with the end code K29.7 (END). A data code (D**.*) (as will be described later, D**.* is any of D0.0 to D31.7) is arranged in a portion sandwiched between the head code K28.5 and the end code K29.7. It is assumed that the number of words of the data code excluding the head code K28.5 and the end code K29.7 arranged in one packet pkt is a fixed length of N words. In this case, a fixed length of one packet pkt including the head code K28.5 and the end code K29.7 is (N+2) words.

The counter 5 is configured to receive the timing signal Sig3 from the alignment unit 3. The counter 5 is configured to count up the number of timing signals Sig3 received after the alignment unit 3 sets a 10-bit boundary. When the counted value reaches the number of words N of the data code sandwiched between the head code K28.5 and the end code K29.7, the counter 5 is configured to transmit a packet end signal Sig4 indicating that the end of the packet pkt has been reached to the buffer 6. In addition, the counter 5 is configured to be reset once the alignment unit 3 having received the boundary indication signal Sig1 based on the head code K28.5 resets a 10-bit boundary.

The buffer 6 is configured to sequentially accumulate 8-bit word data transmitted from the 10B/8B decoder 4 and at least hold data worth of one frame corresponding to one packet pkt.

The buffer 6 includes a CRC unit 6a (error detection unit). When the CRC unit 6a receives the packet end signal Sig4 from the counter 5, the CRC unit 6a is configured to perform a CRC (cyclic redundancy check) of the data code (D**.*) excluding the head code K28.5 and the end code K29.7 in one frame held in the buffer 6 and detect a bit error. When the CRC unit 6a does not detect a bit error, data of the frame held in the buffer 6 becomes usable by constituent units in subsequent stages.

On the other hand, when the CRC unit 6a detects a bit error, data of the frame held by the buffer 6 is rejected and becomes unusable by the constituent units in subsequent stages. Furthermore, when a bit error is detected, the CRC unit 6a is configured to transmit an error signal Sig5 to the retransmission processing unit 7.

When the retransmission processing unit 7 receives the error signal Sig5 from the CRC unit 6a, the retransmission processing unit 7 is configured to transmit a retransmission request signal that requests a retransmission of the packet pkt in which the bit error had been detected to the serial data transmitting apparatus of the serial communication system.

In such a configuration, after a decoding result is the head code K28.5, the 10B/8B decoder 4 is configured to monitor whether or not a certain number (M-number shown in FIG. 2) of pieces of word data are correctly decoded based on a code table such as the tables shown in FIGS. 4 and 5 and, when correctly decoded, the 10B/8B decoder 4 is configured to transmit an enable signal Sig2 to the head code detection unit 2.

Figure 3:
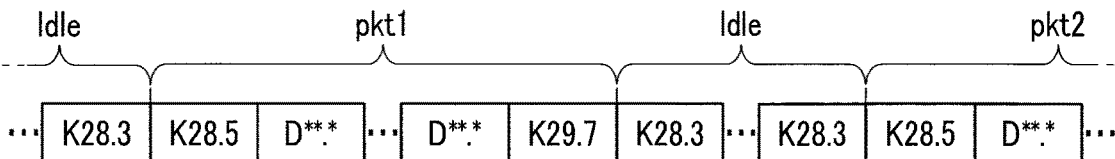
FIG. 3 is a diagram showing an example of transmitting an idle code indicating that there is no data code when there is no data to be transmitted in the 8B/10B encoding scheme according to the first embodiment and the comparative example.

FIG. 3 is a diagram showing an example of transmitting an idle code indicating that there is no data code when there is no data to be transmitted in the 8B/10B encoding scheme according to the first embodiment and the comparative example.

In the example shown in FIG. 3, a period preceding a first packet pkt1 and a period between the first packet pkt1 and a second packet pkt2 are idle periods. During an idle period, an idle code is transmitted from the serial data transmitting apparatus. An idle code K28.3 that is a control code worth of one word is called "Idle" (refer to FIG. 5).

When a decoding result is the head code K28.5, after it is recognized that the packet pkt has been started, the 10B/8B decoder 4 is configured to also monitor whether or not a data code of a certain number (M-number shown in FIG. 2) of subsequent words are correctly decoded in order to verify that the alignment adjusted by the alignment unit 3 is truly correct.

FIG. 4 is a chart showing an example of a part of the data code table used in the 8B/10B encoding scheme according to the first embodiment and the comparative example. Note that while data codes D0.0 to D7.0 are illustrated in FIG. 4 as a part of the data code table used in the 8B/10B encoding scheme, the actual data code table includes data codes from D0.0 to D31.7.

In FIG. 4, there are two kinds of codes after 10-bit conversion: codes with a positive (+) running disparity (RD) and codes with a negative (−) running disparity (RD). Therefore, there are 256×2=512 types of data codes. An initial value of running disparity is negative, and codes with a negative running disparity and codes with a positive running disparity are essentially alternately transmitted from the serial data transmitting apparatus. However, if the number of 0's and 1's in the code is equal, the polarity of running disparity is maintained and transmitted.

In addition, there are 9×2=18 types of control codes shown in the example in FIG. 5 when RD +/− is taken into consideration. Therefore, the number of types of codes when combining data codes and control codes are, for example 512+18=530 types. On the other hand, there are 1024 bit arrangements of 10 bits. Therefore, there are about 500 types of bit arrangements of 10 bits that are not present in the code tables. If word data of a random bit arrangement is to be received, the 10B/8B decoder 4 is to detect a 10-bit arrangement that is not present in the code tables approximately ½ of the time. The 10B/8B decoder 4 is configured to monitor such 10-bit arrangements that are not correctly decoded.

The serial data transmitting apparatus of the 8B/10B encoding scheme is configured to convert (encode) 8-bit data into a 10-bit data code by referring to the data code table shown in FIG. 4, add a 10-bit control code such as the control codes shown in the control code table in FIG. 5, and transmit the 10-bit data code. While receiving the M (M<N) pieces of word data shown in FIG. 2 after decoding the head code K28.5, the 10B/8B decoder 4 is configured to transmit the enable signal Sig2 to the head code detection unit 2 if the received 10-bit data is described in the data code table. The enable signal Sig2 is a signal indicating that, since a data code has been correctly decoded, synchronization of a 10-bit boundary should be maintained. In addition, the 10B/8B decoder 4 is configured not to transmit the enable signal Sig2 to the head code detection unit 2 if the received 10-bit data is not described in the data code table.

Furthermore, the 10B/8B decoder 4 is configured to determine that the presently set 10-bit boundary is correct if received data codes are correctly decoded until reaching M data codes. In addition, the 10B/8B decoder 4 is configured to stop transmission of the enable signal Sig2 so as to enable detection of a next head code K28.5 once the received data codes exceed M data codes.

After once detecting the head code K28.5, the head code detection unit 2 is configured not to search for a bit arrangement of 10 bits that matches the head code K28.5 while receiving the enable signal Sig2 on the assumption that the boundary indication signal Sig1 transmitted to the alignment unit 3 is correct. In this manner, synchronization of the 10-bit boundary is maintained while the head code detection unit 2 is receiving the enable signal Sig2.

On the other hand, the head code detection unit 2 is configured to restart a search for a bit arrangement of 10 bits that matches the head code K28.5 once the enable signal Sig2 is no longer received.

FIG. 6 is a chart showing, side by side, the head code K28.5 that indicates a head of a packet pkt and two data codes D9.3 and D22.0 as an example in the 8B/10B encoding scheme according to the first embodiment and the comparative example. FIG. 7 is a diagram showing an example in which, in an event where a bit error occurs when the two data codes D9.3 and D22.0 shown in FIG. 6 are consecutively transmitted, a same bit arrangement as the head code K28.5 is created according to the first embodiment and the comparative example. When the data code D9.3 that is RD+ and the data code D22.0 that is RD+ such as shown in FIG. 6 are consecutively transmitted, a bit arrangement such as shown in FIG. 7 is created. In FIG. 7, the bit arrangement in a portion enclosed by a dotted ellipse is "0011011010".

At this point, when a head bit "0" (a bit enclosed by a solid square in FIG. 7) of the RD+ data code D22.0 changes to "1" due to a bit error, the bit arrangement in the portion enclosed by the dotted ellipse changes to "0011111010" and becomes the same as the bit arrangement of the RD-head code K28.5.

While FIG. 7 shows an example where a same bit arrangement as the head code K28.5 is created due to a bit error having occurred in a trailing data code of two consecutive data codes, the creation of a same bit arrangement as the head code K28.5 is not limited to this example and a same bit arrangement as the head code K28.5 may be created due to a bit error having occurred in a leading data code.

Figure 8:
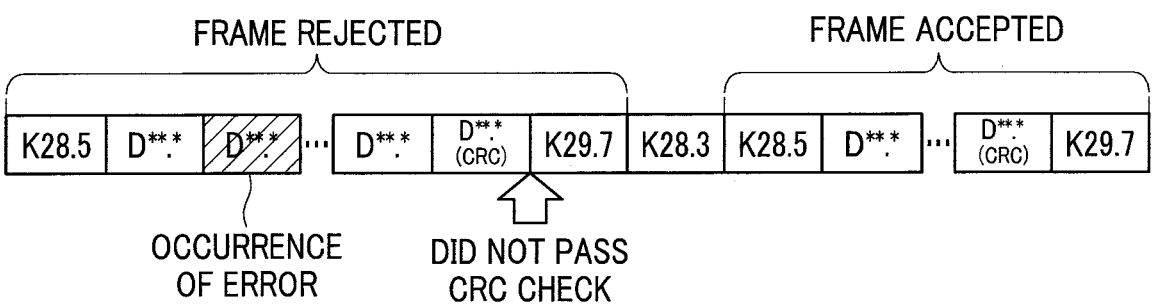
FIG. 8 is a diagram showing an example in which, when a bit error occurs in a packet, a frame in which the bit error had occurred is rejected according to the first embodiment and the comparative example.

FIG. 8 is a diagram showing an example in which, when a bit error occurs in the packet pkt, a frame in which the bit error had occurred is rejected according to the first embodiment and the comparative example.

The CRC unit 6*a* is configured to detect whether or not a bit error has occurred in an entire data code in one frame. The serial data transmitting apparatus is configured to consider the entire data code in one frame as a number and, by adding a remainder of a division of the number by a specific number to the data code, the serial data transmitting apparatus is configured to generate a data code a remainder of which is 0 and transmit the generated data code. The CRC unit 6*a* is configured to divide the entire data code in one received frame by the specific number and detect that a bit error has not occurred if the remainder is 0 but detect that a bit error has occurred if the remainder is other than 0.

When the CRC unit 6*a* detects that a bit error has occurred, the frame in which the bit error has occurred is rejected (specifically, use by the constituent units in subsequent stages is disabled). When only a simple bit error has occurred, as shown in FIG. 8, a normal operation is performed from a frame following the frame in which the bit error has occurred.

Figure 9:
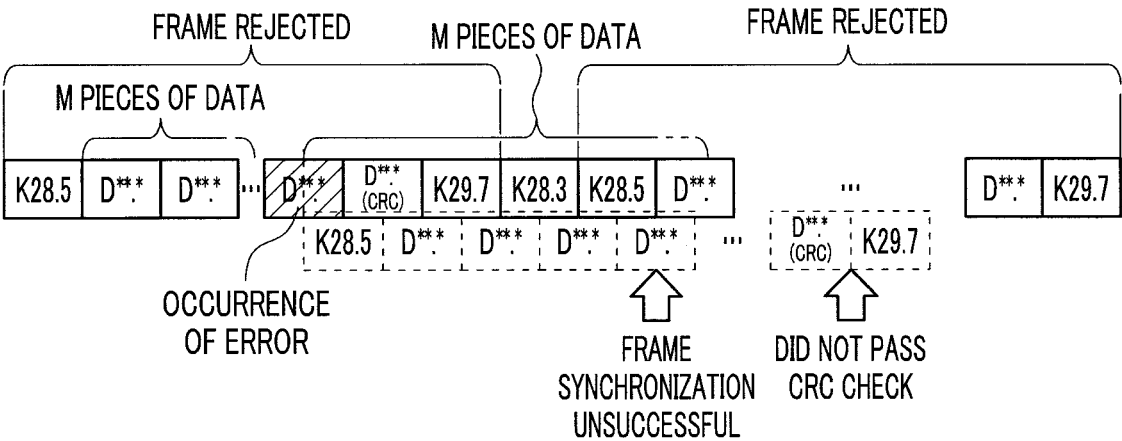
FIG. 9 is a diagram showing an example in which, when a same bit arrangement as a head code is created due to a bit error having occurred in a given packet, not only a frame in which the bit error had occurred but a next frame is also rejected according to the comparative example.

FIG. 9 is a diagram showing an example in which, when a same bit arrangement as the head code K28.5 is created due to a bit error having occurred in a given packet pkt, not only a frame in which the bit error had occurred but a next frame is also rejected according to the comparative example.

It is assumed that a same bit arrangement as the head code K28.5 is created so as to straddle a 10-bit boundary between two pieces of word data as described with reference to FIG. 7.

In this case, when a position where the same bit arrangement as the head code K28.5 has been created is a position within M words from a head of the packet pkt excluding the head code K28.5, since the enable signal Sig2 has been received, the head code detection unit 2 does not search for a bit arrangement of 10 bits that matches the head code K28.5.

Therefore, since synchronization of the 10-bit boundary having already been adjusted is maintained, the two pieces of word data shown in FIG. 7 is interpreted as the correct data code D9.3 of one word and the data code D22.0 of one word in which a bit error has occurred and, accordingly, only the one frame including the data code D22.0 in which the bit error has occurred is to be rejected.

On the other hand, when the position where the same bit arrangement as the head code K28.5 has been created is a position exceeding M words from the head of the packet pkt excluding the head code K28.5, since the enable signal Sig2 has not been received, the head code detection unit 2 searches for a bit arrangement of 10 bits that matches the head code K28.5. Therefore, a same bit arrangement as the head code K28.5 is detected from the two pieces of word data shown in FIG. 7.

The bit arrangement detected at this point will be called pseudo-head code K28.5. The head code detection unit 2 is configured to transmit a new boundary indication signal Sig1 in accordance with a position of the pseudo-head code K28.5 in the two words to the alignment unit 3. Accordingly, the alignment unit 3 is configured to set a bit arrangement enclosed by the dotted ellipse in FIG. 7 as a new 10-bit boundary. In FIG. 9, the new 10-bit boundary indicated by a dotted line is set at a position that is offset from the original 10-bit boundary indicated by a solid line. In addition, a data string indicated by the dotted line in FIG. 9 is sequentially transmitted from the alignment unit 3 as a new packet pkt.

The counter 5 is configured to be reset once the alignment unit 3 sets a 10-bit boundary in accordance with the boundary indication signal Sig1 based on the pseudo-head code K28.5. Since the counted number has not yet reached the number of words N of the data code in the one packet pkt shown in FIG. 2 at the reset time point, data from the head code K28.5 to the pseudo-head code K28.5 is rejected.

In addition, the counter 5 is configured to count up the number of timing signals Sig3 received after the alignment unit 3 sets a 10-bit boundary in accordance with the boundary indication signal Sig1 based on the pseudo-head code K28.5 in a similar manner as described above. It is assumed that, at this point, a bit arrangement of word data transmitted from the alignment unit 3 following the pseudo-head code K28.5 matches any of the bit arrangements of data codes D0.0 to D31.7 described in the data code table. Hereinafter, a bit arrangement that is recognized as a data code (D**.*) despite not being an original data code will be called pseudo-data code (D**.*).

It is assumed that the head code K28.5 of an original next packet pkt is transmitted as indicated by the solid line in FIG. 9 while a pseudo-data code (D**.*) as indicated by the dotted line in FIG. 9 is being consecutively transmitted. At this point, when a position of the head code K28.5 of the original next packet pkt is within M words from the pseudo-head code K28.5, the head code detection unit 2 is configured not to search for a bit arrangement of 10 bits that matches the head code K28.5 as described above. Therefore, the head code K28.5 of the original next packet pkt is not recognized and, as a result, the next frame is also rejected.

In this manner, when a same bit arrangement as the head code K28.5 is created due to a bit error, depending on the position of the occurred bit error, the bit error may affect not only a frame in which the bit error had occurred but also a frame next to the frame in which the bit error had occurred and may result in two consecutive frames being rejected.

Figure 10:
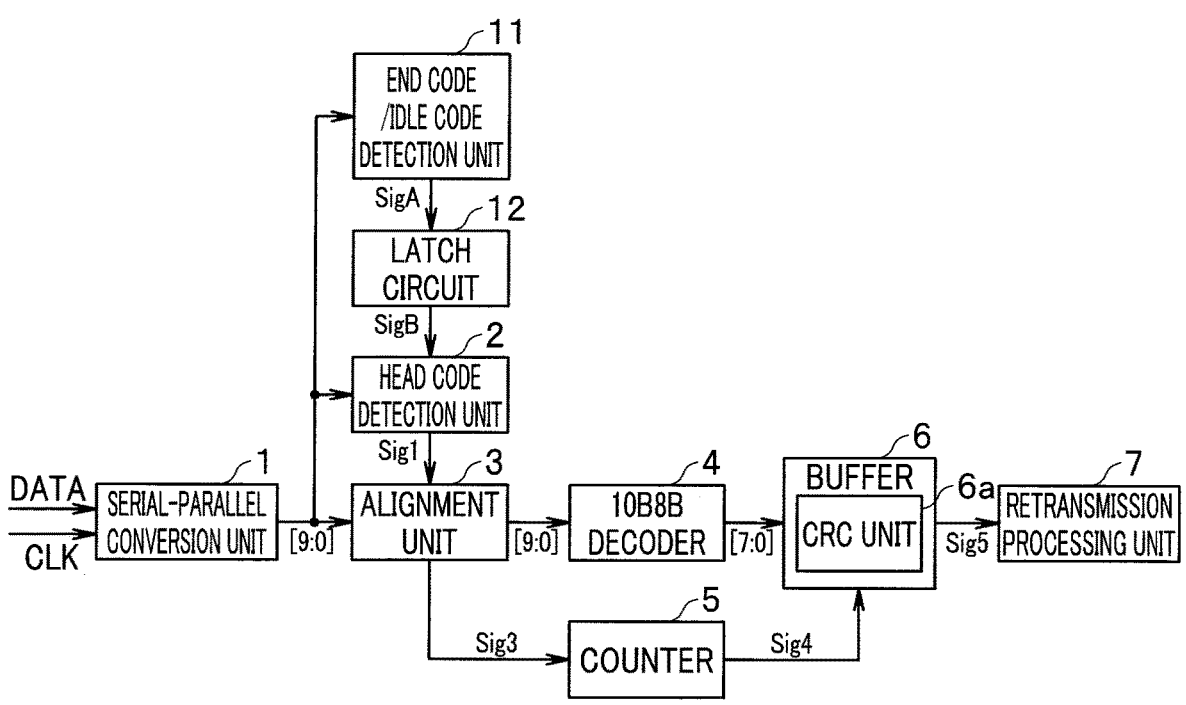
FIG. 10 is a block diagram showing a configuration of a serial data receiving apparatus according to the first embodiment.

FIG. 10 is a block diagram showing a configuration of a serial data receiving apparatus according to the first embodiment. In the description of FIG. 10, portions similar to the portions described above will be denoted by same reference signs and descriptions of such portions will be omitted as appropriate, and differences will be mainly described.

The serial data receiving apparatus according to the first embodiment includes an end code/idle code detection unit 11 and a latch circuit 12 in addition to the configuration shown in FIG. 1.

The serial-parallel conversion unit 1 is connected to the end code/idle code detection unit 11. The end code/idle code detection unit 11 is connected to the latch circuit 12. The latch circuit 12 is connected to the head code detection unit 2.

In addition, the 10B/8B decoder 4 is configured not to transmit the enable signal Sig2 shown in FIG. 1 to the head code detection unit 2 and the head code detection unit 2 is configured not to use the enable signal Sig2 for processing.

The end code/idle code detection unit 11 is configured to hold word data of 10 bits worth of two consecutive words received from the serial-parallel conversion unit 1. The end code/idle code detection unit 11 is configured to search for a bit arrangement of 10 bits that matches a bit arrangement of an idle code K28.3 worth of one word indicating that there is no data code and a bit arrangement of an end code K29.7 worth of one word indicating an end of a packet pkt from among a bit arrangement of the data worth of two words being held.

When a bit arrangement matching either the idle code K28.3 or the end code K29.7 is detected as a result of the search, the end code/idle code detection unit 11 is configured to transmit a first detection signal SigA to the latch circuit 12.

The first detection signal SigA includes information indicating by how many bits a position where the bit arrangement matching either the idle code K28.3 or the end code K29.7 has been detected is offset from the 10-bit boundary of the word data received from the serial-parallel conversion unit 1.

The latch circuit 12 is configured to receive the first detection signal SigA from the end code/idle code detection unit 11 and to hold the first detection signal SigA. A period during which the latch circuit 12 holds the first detection signal SigA is a period during which the head code detection unit 2 searches for a bit arrangement of the head code K28.5 from the bit arrangement of the data worth of two consecutive words including next data worth of one word.

The period is the same as a period during which the end code/idle code detection unit 11 searches for a bit arrangement of either the idle code K28.3 or the end code K29.7 from a bit arrangement of data worth of two consecutive words including next data worth of one word.

The latch circuit 12 is configured to transmit a second detection signal SigB to the head code detection unit 2 during a period in which the first detection signal SigA is being held. The second detection signal SigB includes information indicating by how many bits the 10-bit boundary is to be offset in a similar manner to the first detection signal SigA described above.

The head code detection unit 2 is configured to monitor, during a period in which the second detection signal SigB is being received from the latch circuit 12, whether a bit arrangement matching the head code K28.5 is detected at a position of the 10-bit boundary indicated by the second detection signal SigB in the bit arrangement of the data worth of two words. When a bit arrangement matching the head code K28.5 is detected, the head code detection unit 2 is configured to transmit the boundary indication signal Sig1 to the alignment unit 3.

The boundary indication signal Sig1 transmitted at this point is to include information on a 10-bit boundary common to the bit arrangement matching either the idle code K28.3 or the end code K29.7 and the bit arrangement matching the head code K28.5.

The head code detection unit 2 transmits the boundary indication signal Sig1 to the alignment unit 3 in this manner either when the idle code K28.3 and the head code K28.5 are consecutively transmitted or when the end code K29.7 and the head code K28.5 are consecutively transmitted from the serial-parallel conversion unit 1.

The end code/idle code detection unit 11 (first detection unit), the latch circuit 12, and the head code detection unit 2 (second detection unit) described above constitute the detection unit.

The data worth of two consecutive words in which the end code/idle code detection unit 11 had detected the idle code K28.3 or the end code K29.7 and the data worth of two consecutive words in which the head code detection unit 2 had detected the head code K28.5 are offset by one word. Therefore, the detection unit is configured to detect a specific bit arrangement in which the idle code K28.3 or the end code K29.7 and the head code K28.5 are sequentially consecutive from a bit arrangement of parallel data worth of three words having been converted from the serial data DATA an alignment of which has not been adjusted.

Note that since the head code detection unit 2 does not receive the enable signal Sig2, detection of the specific bit arrangement by the detection unit is performed every time word data is transmitted from the serial-parallel conversion unit 1.

When receiving the boundary indication signal Sig1 from the head code detection unit 2 as a result of detection of the specific bit arrangement, the alignment unit 3 is configured to adjust an alignment by setting a correct 10-bit boundary in the bit arrangement of the held data worth of two consecutive words as described above and to transmit one piece of word data an alignment of which has been adjusted to the 10B/8B decoder 4.

Other components and actions of the serial data receiving apparatus according to the first embodiment are similar to the components and actions of the comparative example shown in FIG. 1.

Figure 11:
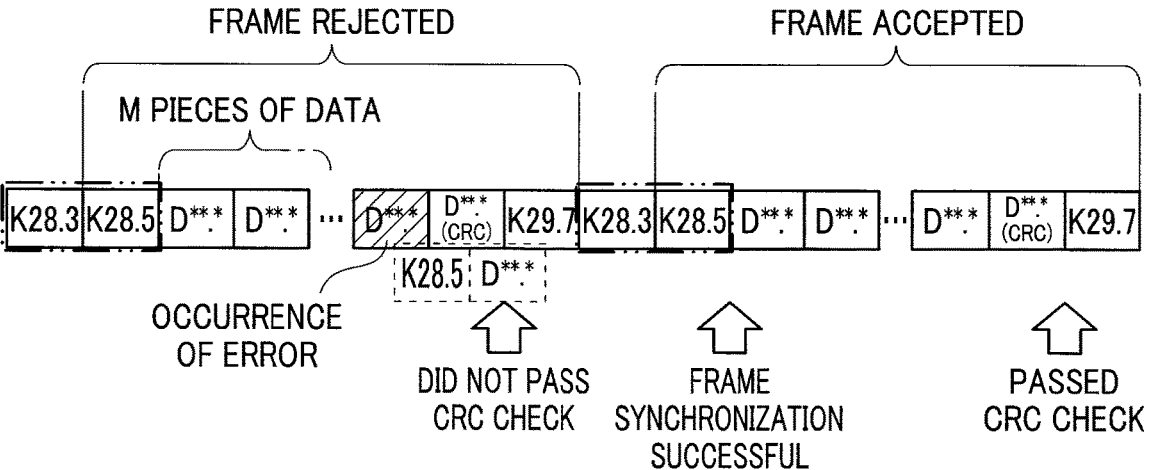
FIG. 11 is a diagram showing an example in which, even when a same bit arrangement as a head code is created due to a bit error, a frame following a frame in which the bit error had occurred is not rejected according to the first embodiment.

FIG. 11 is a diagram showing an example in which, even when a same bit arrangement as the head code K28.5 is created due to a bit error, a frame following a frame in which the bit error had occurred is not rejected according to the first embodiment.

It is assumed that, even in the example shown in FIG. 11, a pseudo-head code K28.5 is created due to a bit error at a position exceeding M words from the head of a packet pkt excluding the head code K28.5 in a similar manner to the example shown in FIG. 9.

In the configuration of the first embodiment, a bit arrangement matching either the idle code K28.3 or the end code K29.7 is not detected before the pseudo-head code K28.5. Therefore, the first detection signal SigA is not transmitted from the end code/idle code detection unit 11 and the second detection signal SigB is not transmitted from the latch circuit 12.

Therefore, a requirement for the head code detection unit 2 to transmit the boundary indication signal Sig1 or, in other words, a requirement that a bit arrangement matching the head code K28.5 is detected during a period in which the second detection signal SigB is being received is not satisfied. Therefore, the head code detection unit 2 is configured not to transmit a new boundary indication signal Sig1 to the alignment unit 3 and synchronization of the existing 10-bit boundary is maintained.

As a result, as shown in FIG. 11, while a frame in which a bit error had occurred is rejected, since the idle code K28.3 and the head code K28.5 are consecutively detected in a next frame, the next frame is not rejected and a normal operation is performed.

According to the first embodiment, even when a pseudo-head code K28.5 is created due to a bit error in a packet, an effect of the bit error to packets other than the packet in which the bit error had occurred can be reduced.

Figure 12:
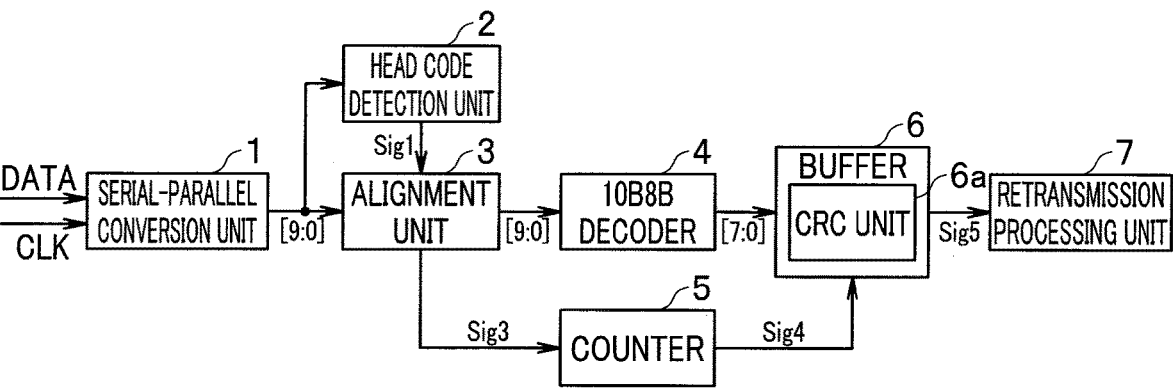
FIG. 12 is a block diagram showing a configuration of a serial data receiving apparatus according to a modification of the first embodiment.

FIG. 12 is a block diagram showing a configuration of a serial data receiving apparatus according to a modification of the first embodiment.

The present modification omits the end code/idle code detection unit 11 and the latch circuit 12 from the configuration of the first embodiment shown in FIG. 10. As a result, the present modification differs from the comparative example shown in FIG. 1 in that the 10B/8B decoder 4 is configured not to transmit the enable signal Sig2 to the head code detection unit 2 and the head code detection unit 2 is configured not to use the enable signal Sig2 for processing.

In this case, detection of a bit arrangement of the head code K28.5 by the head code detection unit 2 is performed every time word data is transmitted from the serial-parallel conversion unit 1. As a result, the pseudo-head code K28.5 is detected. However, the head code K28.5 of an original next packet pkt that is transmitted after the pseudo-head code K28.5 is also detected by the head code detection unit 2.

Therefore, a frame next to the frame in which the bit error had occurred is not rejected and a normal operation is performed from the next frame.

In this manner, even according to the modification of the first embodiment, an effect of the bit error to packets other than the packet in which the bit error had occurred can be reduced.

While the serial data receiving apparatus has been mainly described above, an embodiment of the present invention may be a serial data receiving method in which a component of each unit is replaced with a processing step.

In addition, while an example of a serial communication system adopting an 8B/10B encoding scheme has been described above, the embodiment is not limited to the example. The embodiment can be widely applied to a serial communication system in which a packet is started with a head code worth of one word and an idle code worth of one word indicating that there is no data code or an end code worth of one word indicating an end of the packet is arranged before the head code.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A serial data receiving apparatus, comprising:

a code detector configured to detect a specific bit arrangement in which an idle code worth of one word that indicates that there is no data code or an end code worth of one word that indicates an end of a packet, and a head code worth of one word indicating a head of a packet are sequentially consecutive, from a bit arrangement of parallel data worth of three words converted from serial data; and a word data aligner configured to adjust an alignment of word data based on a bit boundary of the detected specific bit arrangement.

2. The serial data receiving apparatus according to claim 1, further comprising a serial-parallel data converter configured to convert the received serial data into parallel data with a first bit width and to output the converted data as data worth of one word, wherein the code detector includes:

a first code detector configured to search for a bit arrangement of the idle code and a bit arrangement of the end code from a bit arrangement of data worth of two consecutive words received from the serial-parallel data converter and to transmit a first detection signal when any one of the bit arrangements is detected;

a latch circuit configured to receive the first detection signal from the first code detector and to hold the first detection signal during a period in which the first code detector detects any one of the bit arrangements from the bit arrangement of data worth of two consecutive words including next data worth of one word; and a second code detector configured to detect a bit arrangement of the head code from the bit arrangement of the data worth of two consecutive words received from the serial-parallel data converter and to transmit a boundary indication signal indicating a bit boundary of an alignment when a bit arrangement of the head code is detected during the period in which the first detection signal is held in the latch circuit, the word data aligner is configured to transmit, when the boundary indication signal is received from the second code detector, data having an adjusted alignment from the bit arrangement of the data worth of two consecutive words received from the serial-parallel data converter, and the serial data receiving apparatus further comprises a decoder configured to decode the data with the first bit width received from the word data aligner into data with a second bit width that is narrower than the first bit width.

3. The serial data receiving apparatus according to claim 2, wherein the word data aligner is configured to transmit, after receiving the boundary indication signal, a timing signal every time data having an adjusted alignment is transmitted, and the serial data receiving apparatus further comprises:

a counter configured to receive the timing signal from the word data aligner, to count a number of the received timing signal, and to transmit a packet end signal when a number of words worth of one packet excluding the head code and the end code is counted;

a buffer configured to hold the data worth of at least one packet received from the decoder;

an error bit detector configured to detect a bit error of data excluding the head code and the end code in the data worth of one packet held in the buffer until the packet end signal is received from the counter and to transmit an error signal when the bit error is detected; and a retransmission processor configured to request, when the error signal is received from the error bit detector, a serial data transmitting apparatus to retransmit the packet in which the bit error is detected.

4. The serial data receiving apparatus according to claim 2, wherein the serial data is data encoded in an 8B/10B encoding scheme, the first bit width is 10 bits and the second bit width is 8 bits, and the decoder is a 10B/8B decoder configured to refer to a code table of the 8B/10B encoding scheme and to decode a 10-bit code into 8-bit data.

5. A serial data receiving method, comprising:

detecting a specific bit arrangement in which an idle code worth of one word that indicates that there is no data code or an end code worth of one word that indicates an end of a packet, and a head code worth of one word indicating a head of a packet are sequentially consecutive, from a bit arrangement of parallel data worth of three words converted from serial data; and adjusting an alignment of word data based on a bit boundary of the detected specific bit arrangement.

* * * * *